(12) United States Patent
Morioka

(10) Patent No.: US 11,452,114 B2
(45) Date of Patent: Sep. 20, 2022

(54) WIRELESS COMMUNICATION CONTROL DEVICE, WIRELESS COMMUNICATION CONTROL METHOD, WIRELESS COMMUNICATION DEVICE, AND WIRELESS COMMUNICATION METHOD

(71) Applicant: Sony Corporation, Tokyo (JP)

(72) Inventor: Yuichi Morioka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 17/267,809

(22) PCT Filed: Aug. 20, 2019

(86) PCT No.: PCT/JP2019/032355
§ 371 (c)(1),
(2) Date: Feb. 11, 2021

(87) PCT Pub. No.: WO2020/049997
PCT Pub. Date: Mar. 12, 2020

(65) Prior Publication Data
US 2021/0168825 A1    Jun. 3, 2021

(30) Foreign Application Priority Data
Sep. 3, 2018  (JP) .............................. JP2018-164372

(51) Int. Cl.
*H04W 72/10* (2009.01)
*H04W 28/26* (2009.01)
(Continued)

(52) U.S. Cl.
CPC ........... *H04W 72/10* (2013.01); *H04W 28/26* (2013.01); *H04W 74/006* (2013.01); *H04W 74/08* (2013.01); *H04W 84/12* (2013.01)

(58) Field of Classification Search
CPC ... H04W 72/10; H04W 28/26; H04W 74/006; H04W 74/08; H04W 84/12; H04W 74/004
(Continued)

(56) References Cited

U.S. PATENT DOCUMENTS

2008/0119181 A1* 5/2008 Suzuki ............. H04W 72/1268
455/422.1
2015/0139209 A1  5/2015 Park
(Continued)

FOREIGN PATENT DOCUMENTS

JP  2008-72700 A   3/2008
JP  2016-507183 A  3/2016
(Continued)

OTHER PUBLICATIONS

Dave Cavalcanti (Intel):"Controlling latency in 802.11", IEEE Draft; 11-18-1160-00-0WNG-Controlling-Latency-In-802-11, IEEE-SA Mentor, Piscataway, NJ USA, vol. 802. 11 WNG Jul. 9, 2018 (Jul. 9, 2018), pp. 1-14, XP068128227, Retrieved from the Internet: URL: https://mentor.ieee.org/802.11/dcn/18/11-18-1160-00-0wng-controlling-latency-in-802-11. pptx [retrieved on Jul. 9, 2018]* the whole document*.
(Continued)

*Primary Examiner* — Kwang B Yao
*Assistant Examiner* — Syed M Bokhari
(74) *Attorney, Agent, or Firm* — Xsensus LLP

(57) ABSTRACT

The present disclosure relates to a wireless communication control device, a wireless communication control method, a wireless communication device, and a wireless communication method enabling low latency wireless communication to be achieved.
A calculation unit calculates allowable resource occupancy time in a wireless communication network to which an own
(Continued)

device belongs in response to a low latency request for data generated in the wireless communication network, and a wireless communication unit notifies a wireless communication device in the wireless communication network of the allowable resource occupancy time calculated. The technology according to the present disclosure can be applied to a wireless LAN system.

14 Claims, 14 Drawing Sheets

(51) Int. Cl.
    *H04W 74/00*     (2009.01)
    *H04W 74/08*     (2009.01)
    *H04W 84/12*     (2009.01)

(58) Field of Classification Search
    USPC .......................................................... 370/329
    See application file for complete search history.

(56) References Cited

U.S. PATENT DOCUMENTS

| | | |
|---|---|---|
| 2015/0359008 A1 | 12/2015 | Wang et al. |
| 2017/0171886 A1 | 6/2017 | Nabetani et al. |
| 2018/0077723 A1* | 3/2018 | Adachi ................. H04L 5/0007 |
| 2018/0091282 A1* | 3/2018 | Lim .................. H04W 72/0406 |
| 2019/0357252 A1* | 11/2019 | Sun ..................... H04W 72/042 |

FOREIGN PATENT DOCUMENTS

| | | |
|---|---|---|
| WO | 2016/080335 A1 | 5/2016 |
| WO | 2016/178418 A1 | 11/2016 |

OTHER PUBLICATIONS

International Search Report and Written Opinion dated Oct. 1, 2019, received for PCT Application PCT/JP2019/032355, Filed on Aug. 20, 2019, 10 pages including English Translation.

IEEE Std 802.11-2016, (Revision of IEEE Std 802.11-2012) IEEE Standard for Information Technology, Telecommunications and Information Exchange Between Systems Local and Metropolitan Area Networks—Specific Requirements, Part 11: Wireless LAN Medium Access Control (MAC) and Physical Layer (PHY) Specifications, prepared by the 802.11 Working Group of the LAN/MAN Standards Committee of the IEEE Computer Society, Dec. 7, 2016, 3,534 pages.

* cited by examiner

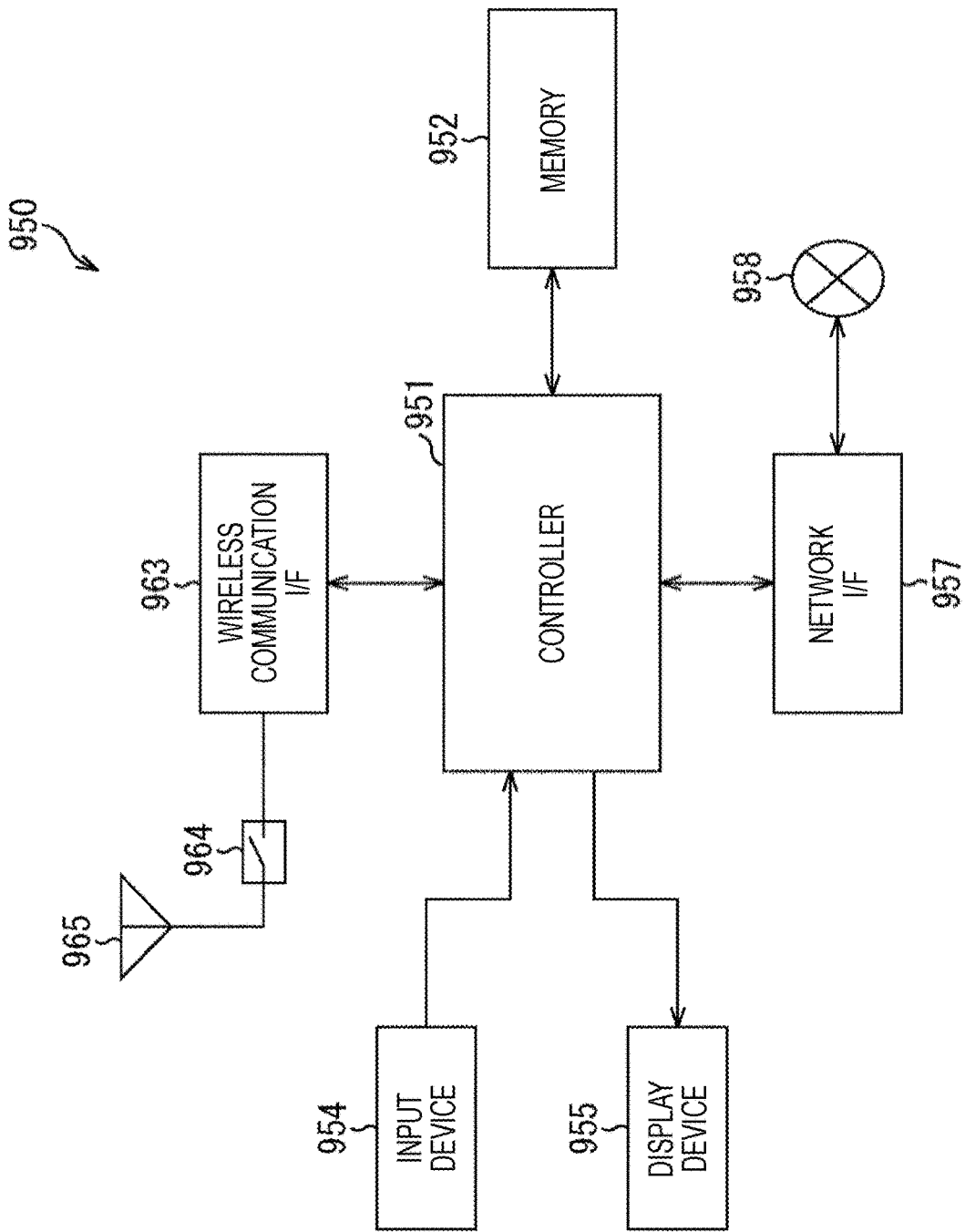

WIRELESS COMMUNICATION CONTROL DEVICE, WIRELESS COMMUNICATION CONTROL METHOD, WIRELESS COMMUNICATION DEVICE, AND WIRELESS COMMUNICATION METHOD

CROSS-REFERENCE TO RELATED APPLICATIONS

The present application is based on PCT filing PCT/JP2019/032355, filed Aug. 20, 2019, which claims the priority to JP 2018-164372, filed Sep. 3, 2018, the entire contents of each are incorporated herein by reference.

TECHNICAL FIELD

The present disclosure relates to a wireless communication control device, a wireless communication control method, a wireless communication device, and a wireless communication method, and particularly relates to a wireless communication control device, a wireless communication control method, a wireless communication device, and a wireless communication method enabling low latency wireless communication to be achieved.

BACKGROUND ART

In recent years, low latency wireless communication has been required for transmission of an ultra-high-quality image in virtual reality (VR) and augmented reality (AR) and remote control of precision equipment such as a robot.

In a wireless local area network (LAN) technology with use of an unlicensed band, a listen before talk (LBT) function is employed, in which an own station refrains from using wireless resources while another station is using the wireless resources. In this case, the delay time of the own station depends on the occupancy time of the wireless resources by the other station.

Meanwhile, Non-Patent Document 1 discloses that the maximum service interval field in enhanced distributed channel access (EDCA) specified in IEEE Std 802.11-2016 is used for latency control for limiting the amount of aggregation used.

CITATION LIST

Non-Patent Document

Non-Patent Document 1: IEEE Standard for Information technology—Telecommunications and information exchange between systems Local and metropolitan area networks—Specific requirements Part 11: Wireless LAN Medium Access Control (MAC) and Physical Layer (PHY) Specifications

SUMMARY OF THE INVENTION

Problems to be Solved by the Invention

However, Non-Patent Document 1 does not disclose that the maximum service interval field is used for latency control in quality of service (QoS) control such as hybrid coordination function controlled channel access (HCCA). Accordingly, even in a case where data to be preferentially transmitted with low latency is generated, the data cannot reliably be transmitted with low latency in some cases.

The present disclosure has been made in view of such a situation and enables low latency wireless communication to be achieved more reliably.

Solutions to Problems

A wireless communication control device according to the present disclosure is a wireless communication control device including a calculation unit that calculates allowable resource occupancy time in a wireless communication network to which an own device belongs in response to a low latency request for data generated in the wireless communication network, and a wireless communication unit that notifies a wireless communication device in the wireless communication network of the allowable resource occupancy time calculated.

A wireless communication control method according to the present disclosure is a wireless communication control method including calculating, by a wireless communication control device, allowable resource occupancy time in a wireless communication network to which an own device belongs in response to a low latency request for data generated in the wireless communication network, and notifying, by the wireless communication control device, a wireless communication device in the wireless communication network of the allowable resource occupancy time calculated.

In the wireless communication control device and method according to the present disclosure, allowable resource occupancy time in a wireless communication network to which an own device belongs is calculated in response to a low latency request for data generated in the wireless communication network, and a wireless communication device in the wireless communication network is notified of the allowable resource occupancy time calculated.

A wireless communication device according to the present disclosure is a wireless communication device including a wireless communication unit that receives allowable resource occupancy time notified by a wireless communication control device in response to a low latency request for data generated in a wireless communication network to which an own device belongs, in which the wireless communication unit performs wireless communication in accordance with limitation due to the allowable resource occupancy time.

A wireless communication method according to the present disclosure is a wireless communication method including receiving, by a wireless communication device, allowable resource occupancy time notified by a wireless communication control device in response to a low latency request for data generated in a wireless communication network to which an own device belongs, and performing, by the wireless communication device, wireless communication in accordance with limitation due to the allowable resource occupancy time.

In the wireless communication device and method according to the present disclosure, allowable resource occupancy time is received that is notified by a wireless communication control device in response to a low latency request for data generated in a wireless communication network to which an own device belongs, and wireless communication is performed in accordance with limitation due to the allowable resource occupancy time.

BRIEF DESCRIPTION OF DRAWINGS

FIG. 15 is a block diagram illustrating a configuration example of a wireless access point.

MODE FOR CARRYING OUT THE INVENTION

Hereinbelow, a mode for carrying out the present disclosure (hereinbelow referred to as an embodiment) will be described. Note that description will be provided in the following order.

1. Overview of Wireless LAN System
2. Configurations and Operations of Devices
3. Interference by Adjacent Network
4. Reservation for Wireless Resources
5. Application Examples <1. Overview of Wireless LAN System>

(Configuration of Wireless LAN System)

Figure 1:
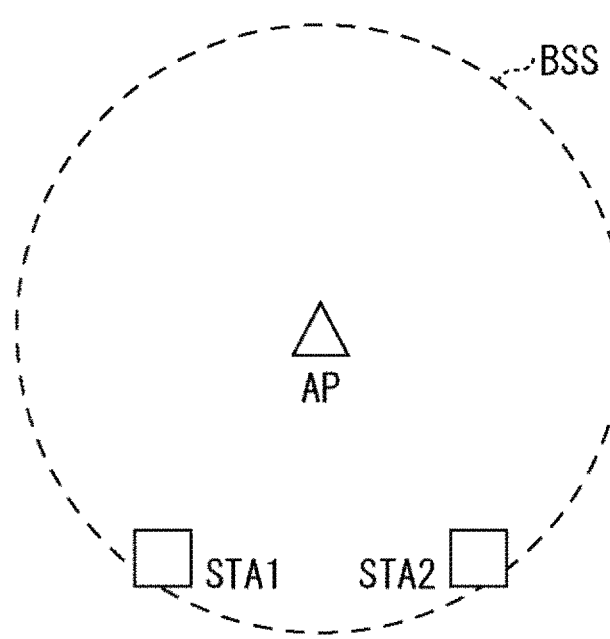
FIG. 1 is a diagram illustrating a configuration example of a wireless LAN system according to an embodiment of the present disclosure.

FIG. 1 is a diagram illustrating a configuration example of a wireless LAN system according to an embodiment of the present disclosure.

The wireless LAN system according to the embodiment of the present disclosure includes an access point device (hereinbelow referred to as an access point (AP)) and a station device (hereinbelow referred to as a station (STA)). In the example in FIG. 1, two devices, an STA 1 and an STA 2, are connected to the AP to cause a basic service set (BSS) serving as a wireless communication network to be provided.

The wireless LAN system according to the embodiment of the present disclosure is installed at an arbitrary location. For example, the wireless LAN system according to the embodiment of the present disclosure is installed in an office building, a house, a commercial facility, a public facility, or the like. The BSS may be arranged so that the area thereof may overlap with the area of another BSS.

The AP functions as a wireless communication control device, is connected to an external network, and provides the STA with communication with the external network. For example, the AP is connected to the Internet and provides communication between the STA and a device on the Internet or a device connected via the Internet.

The STA functions as a wireless communication device and communicates with the AP. The STA may be an arbitrary wireless communication device. The STA may be a smartphone including a display having a display function, a memory having a storage function, a touch panel having an input function, a loudspeaker having an audio output function, and a function of executing advanced calculation processing, for example.

(Conventional Communication Between AP and STA)

In recent years, low latency wireless communication has been required for transmission of an ultra-high-quality image in VR and AR and remote control of precision equipment such as a robot.

In a wireless LAN technology with use of an unlicensed band, an LBT function is employed, in which an own station refrains from using wireless resources while another station is using the wireless resources. In this case, the delay time of the own station depends on the occupancy time of the wireless resources by the other station.

Figure 2:
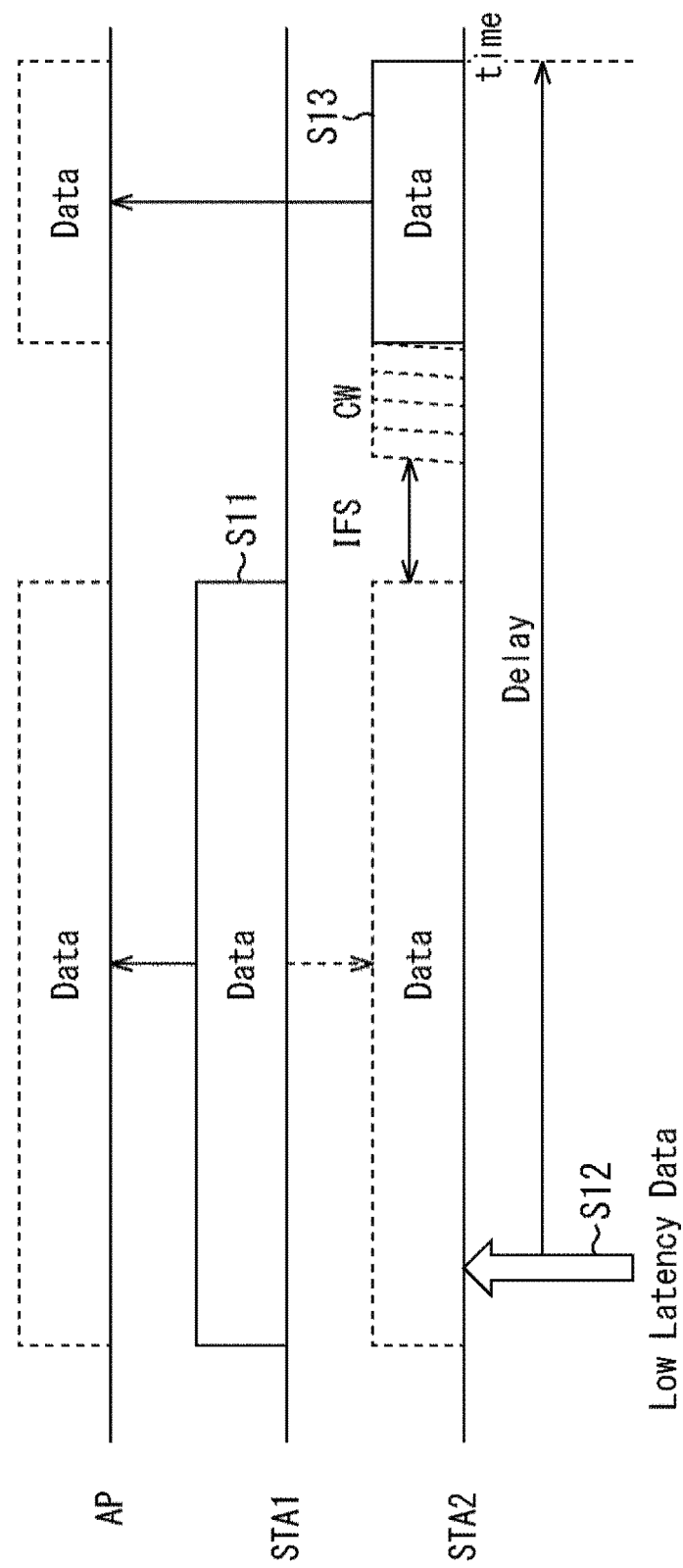
FIG. 2 is a diagram illustrating conventional communication between an AP and STAs.

FIG. 2 is a diagram illustrating communication between one AP and two STAs in a conventional wireless LAN system.

In the example in FIG. 2, while the STA 1 is transmitting a data packet to the AP in step S11, data to be transmitted to the AP with low latency (low latency data) is generated inside the STA 2 in step S12.

In this case, the STA 2 stands by until the end of the data packet transmission by the STA 1 and observes whether or not the medium is ready for use during later inter frame spacing (IFS) and contention windows (CW). The IFS is a fixed period for determining if a channel is in an idle state, and the CW is a variable-length period for avoiding collisions of data packets. When the medium is ready for use for a predetermined period, the STA 2 starts transmitting its own data packet in step S13.

Meanwhile, while the time length of the data packet is on the order of milliseconds in some cases, the time length of the IFS and the CW is about several tens of microseconds. That is, the length of the data packet is 100 times or more the standby time such as the IFS and the CW.

Also, in general, it is assumed that the allowable latency time for video transmission or the like is 10 ms or less from generation of low latency data inside the STA to reception of the data packet by the AP, for example.

Therefore, in the example in FIG. 2, the time until the end of the transmission of the data packet by the STA 1 has a great influence on the data transmission by the STA 2, which hinders low latency wireless communication.

Accordingly, described below is an example in which low latency wireless communication is achieved by limiting resource occupancy time for each communication station in response to generation of low latency data in a wireless communication network.

(Communication Between AP and STA According to Present Disclosure)

Figure 3:
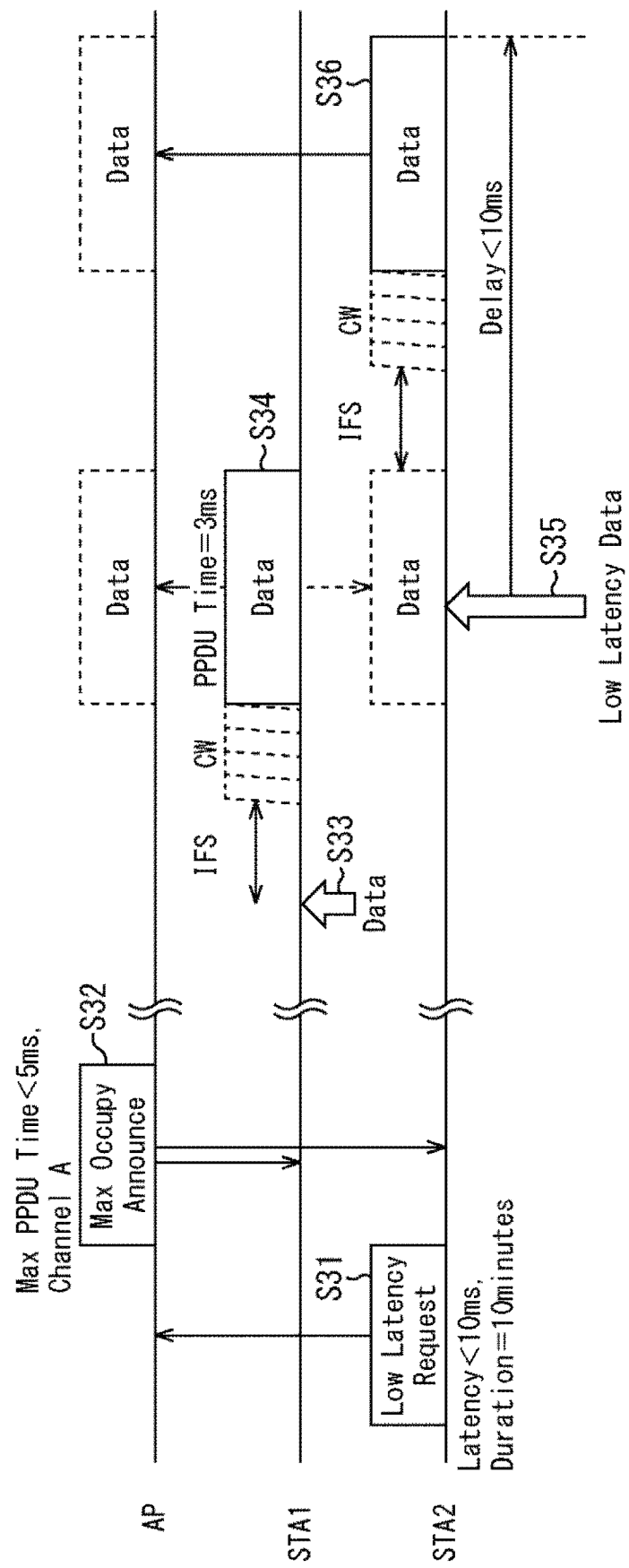
FIG. 3 is a diagram illustrating communication between an AP and STAs according to the present disclosure.

FIG. 3 is a diagram illustrating communication between one AP and two STAs in a wireless LAN system according to the present disclosure. In the example in FIG. 3 as well, the STA 2 has low latency data.

In step S31, the STA 2 transmits a low latency request for data generated in its own device to the AP in advance.

The low latency request includes allowable latency time that may be spent from generation of the data to the end of transmission. The low latency request may also include duration indicating how long the low latency request is valid. In the example in FIG. 3, the allowable latency time is 10 ms, and the duration of the low latency request is 10 minutes.

When the AP receives the low latency request from the STA 2, in step S32, the AP calculates allowable resource occupancy time in the wireless communication network (BSS) on the basis of the allowable latency time included in the low latency request and notifies each STA of the allowable resource occupancy time as Max Occupy Announce.

The allowable resource occupancy time is maximum PLCP protocol data unit (PPDU) time indicating the time length of data that can be allowed as the occupancy time of the wireless resources. In the example in FIG. 3, the maximum PPDU time is 5 ms.

The AP may also notify each STA of duration indicating how long the limitation due to the allowable resource occupancy time is valid. Furthermore, in a case where the AP communicates with each STA over a plurality of frequency bands, the AP may further notify each STA of the band subject to the limitation due to the allowable resource occupancy time. In the example in FIG. 3, each STA is notified of the maximum PPDU time with the band subject to the limitation as channel A.

Also, the AP can receive low latency requests from a plurality of STAs. In this case, the AP calculates the allowable resource occupancy time in response to the respective low latency requests.

When each STA receives the allowable resource occupancy time (maximum PPDU time) notified by the AP, each STA generates data (PPDU) in accordance with the limitation due to the allowable resource occupancy time.

In the example in FIG. 3, when data to be transmitted to the AP is generated inside the STA 1 in step S33, the STA 1 generates data with the PPDU time of 3 ms after the elapse of the IFS and the CW and transmits the data to the AP in step S34. The PPDU time for this data satisfies the limitation due to the maximum PPDU time (5 ms).

Also, in the example in FIG. 3, while the STA 1 is transmitting the data to the AP in step S34, low latency data to be transmitted to the AP with low latency is generated inside the STA 2 in step S35.

In this case, the STA 2 stands by until the end of transmission of the data by the STA 1, and after the elapse of the later IFS and CW, the STA 2 starts transmitting its own data in step S36.

As described above, the data transmitted from the STA 1 has the PPDU time limited to 3 ms by the limitation due to the allowable resource occupancy time. As a result, the STA 2 can transmit the low latency data to the AP within the allowable latency time of 10 ms from generation of the low latency data.

<2. Configurations and Operations of Devices>

Hereinbelow, configurations and operations of the devices included in the aforementioned wireless LAN system will be described.

(Configuration of AP)

Figure 4:
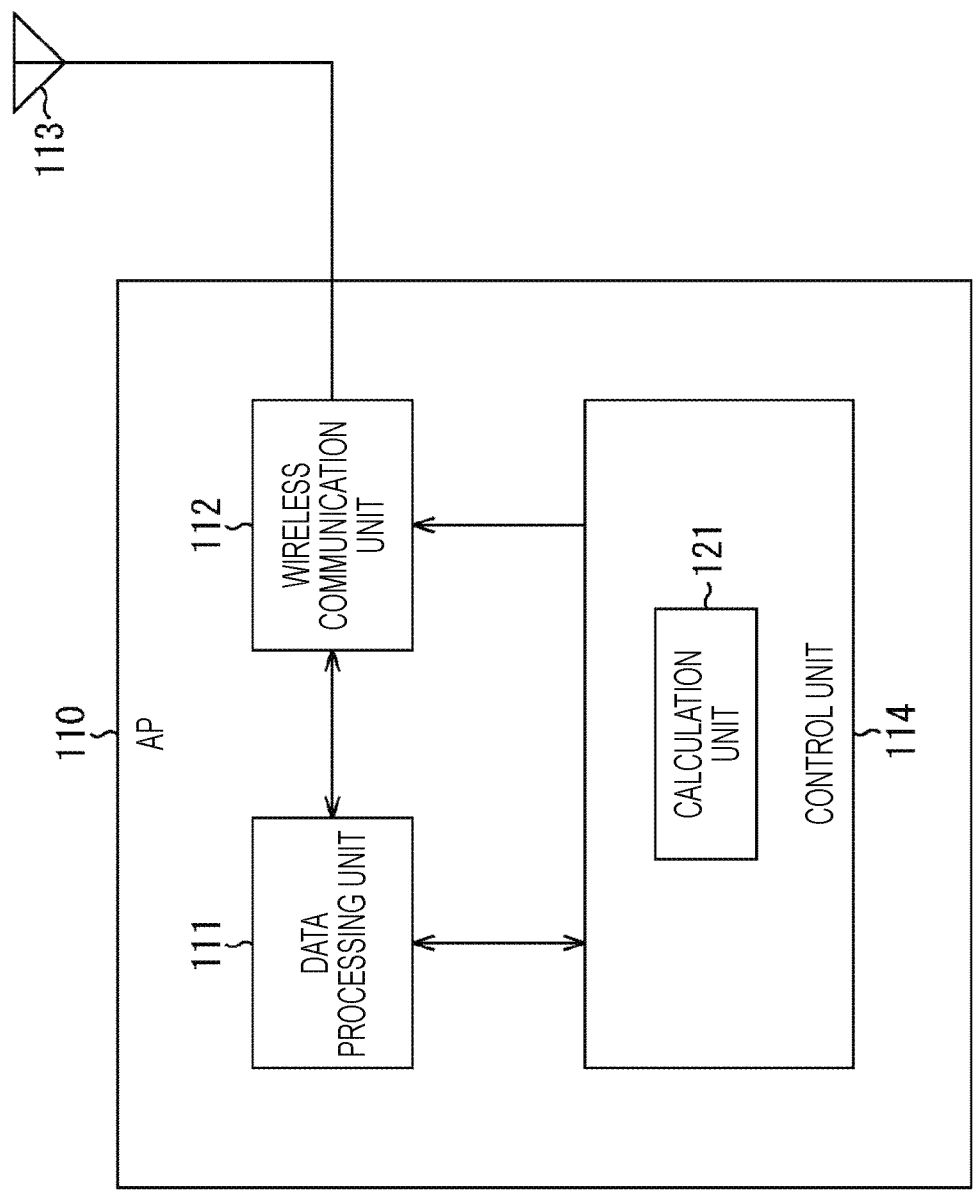
FIG. 4 is a block diagram illustrating a functional configuration example of an AP.

FIG. 4 is a block diagram illustrating a functional configuration example of an AP.

An AP 110 in FIG. 4 includes a data processing unit 111, a wireless communication unit 112, an antenna 113, and a control unit 114.

The data processing unit 111 processes data for transmission and reception. Specifically, the data processing unit 111 generates a frame on the basis of data from a communication upper layer and provides the generated frame to the wireless communication unit 112. For example, the data processing unit 111 generates a frame (packet) from data and performs to the generated frame processing such as addition of a media access control (MAC) header for the MAC and addition of an error detection code.

The data processing unit 111 also extracts data from a received frame and provides the extracted data to the communication upper layer. For example, the data processing unit 111 acquires data by performing to the received frame MAC header analysis, code error detection and correction, reorder processing, and the like.

The wireless communication unit 112 has a signal processing function and a wireless interface function.

The signal processing function is a function of performing signal processing such as modulation to a frame. Specifically, the wireless communication unit 112 performs to the frame from the data processing unit 111 encoding, interleaving, and modulation in accordance with a coding method, a modulation method, and the like set by the control unit 114 and adds a preamble and a PHY header to generate a symbol stream. The wireless communication unit 112 also performs to a symbol stream acquired by processing resulting from the wireless interface function demodulation, decoding, and the like to acquire a frame and provides the acquired frame to the data processing unit 111 or the control unit 114.

The wireless interface function is a function of transmitting and receiving a signal via the antenna 113. Specifically, the wireless communication unit 112 performs analog signal conversion, amplification, filtering, and frequency up-conversion to a signal related to a symbol stream acquired by processing resulting from the signal processing function. The wireless communication unit 112 then transmits the processed signal via the antenna 113. The wireless communication unit 112 further performs reverse processing of the processing at the time of signal transmission, such as frequency down-conversion and digital signal conversion, to a signal acquired from the antenna 113.

The control unit 114 entirely controls the operation of the AP 110. Specifically, the control unit 114 performs processing such as information passing between the respective functions, setting of communication parameters, and scheduling of a frame in the data processing unit 111.

Also, the control unit 114 includes a calculation unit 121 that calculates the aforementioned allowable resource occupancy time (maximum PPDU time) in response to a low latency request from the STA.

Meanwhile, the AP 110 is provided with a not-illustrated storage unit that stores information used for processing of the data processing unit 111 and the control unit 114. The storage unit stores information stored in a transmission frame, information acquired from a reception frame, information regarding communication parameters, and the like.

The AP 110 is also provided with a not-illustrated communication interface that performs communication with an external network.

(Configuration of STA)

Figure 5:
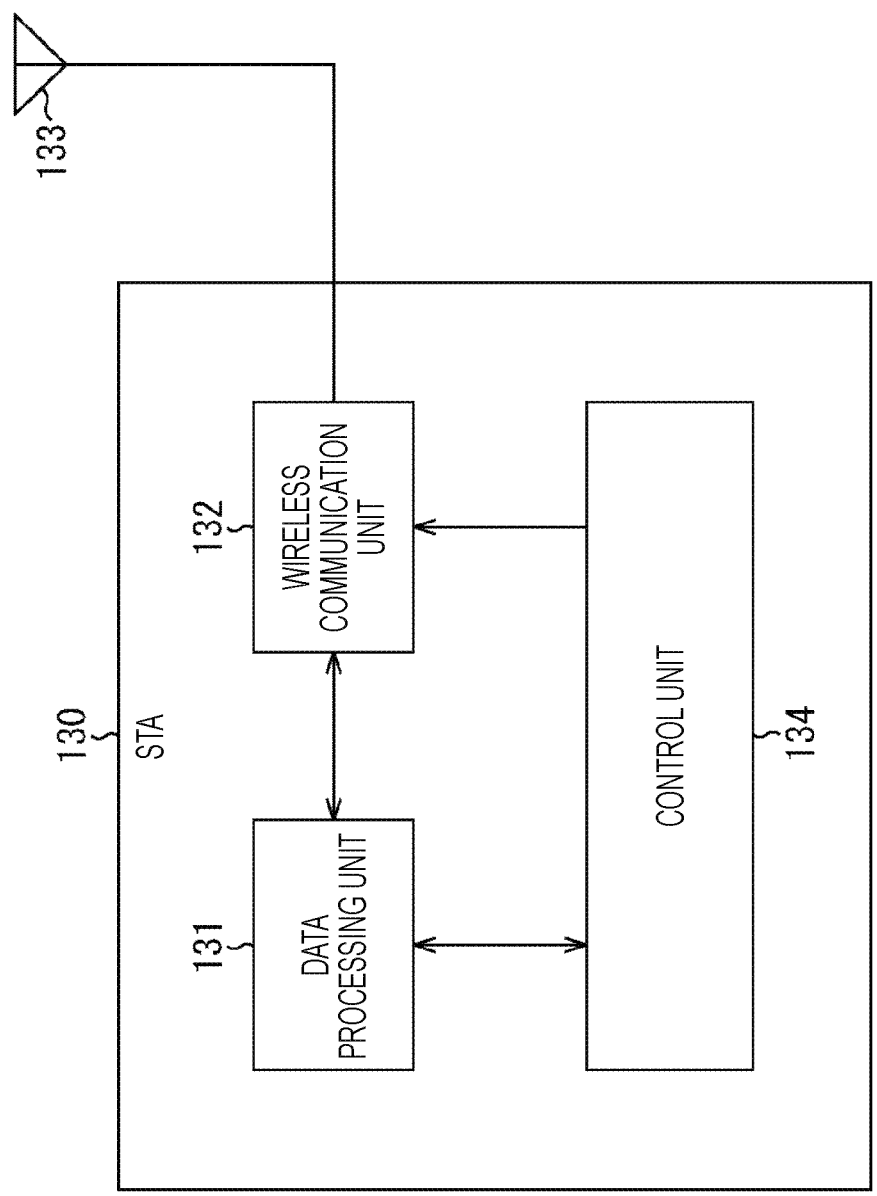
FIG. 5 is a block diagram illustrating a functional configuration example of an STA.

FIG. 5 is a block diagram illustrating a functional configuration example of an STA.

An STA 130 in FIG. 5 includes a data processing unit 131, a wireless communication unit 132, an antenna 133, and a control unit 134.

Note that the data processing unit 131, the wireless communication unit 132, the antenna 133, and the control unit 134 have similar functions to those of the data processing unit 111, the wireless communication unit 112, the antenna 113, and the control unit 114 in FIG. 4, respectively, and that detailed description thereof is thus omitted.

Also, the STA 130 is provided with a not-illustrated storage unit that stores information used for processing of the data processing unit 131 and the control unit 134.

Next, operations of the AP 110 and the STA 130 described above will be described.

(Operation of AP)

Figure 6:
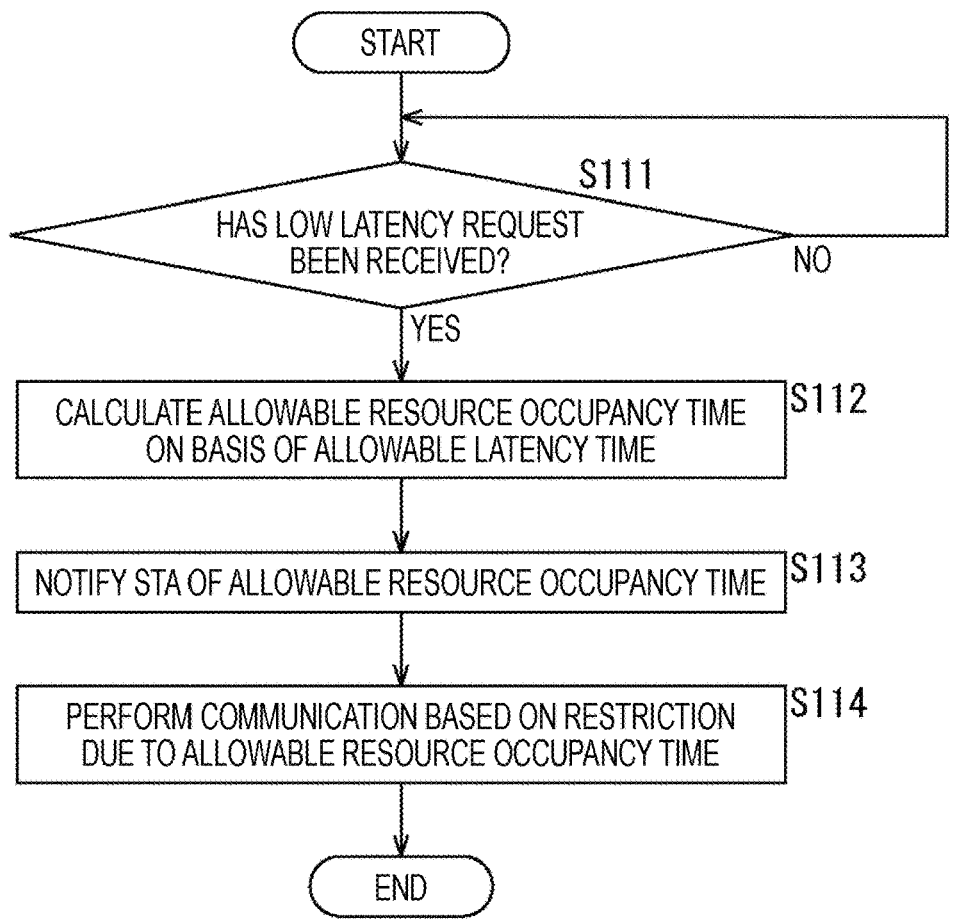
FIG. 6 is a flowchart illustrating an operation of the AP.

First, an operation of the AP 110 in the wireless LAN system according to the present disclosure will be described with reference to the flowchart in FIG. 6.

In step S111, the wireless communication unit 112 determines whether or not a low latency request has been received from the STA 130 in the BSS to which the own device belongs. The processing in step S111 is repeated until it is determined that the low latency request has been received.

In a case where it is determined that the low latency request has been received, in step S112, the calculation unit 121 in the control unit 114 calculates the allowable resource occupancy time (maximum PPDU time) on the basis of the allowable latency time included in the received low latency request.

In step S113, the wireless communication unit 112 notifies each STA 130 in the BSS to which the own device belongs of the allowable resource occupancy time calculated by the calculation unit 121 (transmits the allowable resource occupancy time to each STA 130) via the antenna 113.

Thereafter, in step S114, the control unit 114 controls each unit so that each unit communicates with each STA 130 in accordance with the limitation due to the allowable resource occupancy time.

(Operation of STA)

Figure 7:
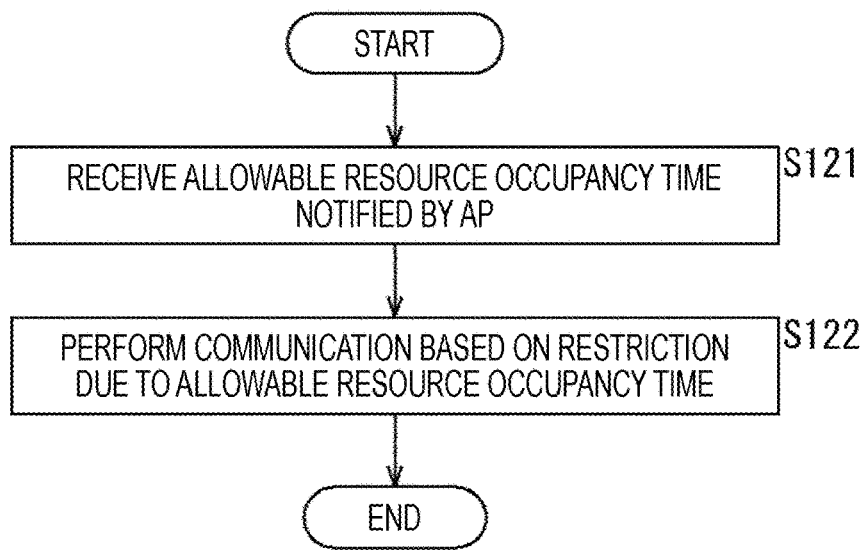
FIG. 7 is a flowchart illustrating an operation of the STA.

Next, an operation of the STA 130 in the wireless LAN system according to the present disclosure will be described with reference to the flowchart in FIG. 7. The processing in FIG. 7 is an operation of each STA 130 when the allowable resource occupancy time is notified by the AP 110.

In step S121, the wireless communication unit 132 receives the allowable resource occupancy time notified by the AP 110 via the antenna 133.

Thereafter, in step S122, the control unit 134 controls each unit so that each unit performs communication in accordance with the limitation due to the allowable resource occupancy time.

Figure 8:
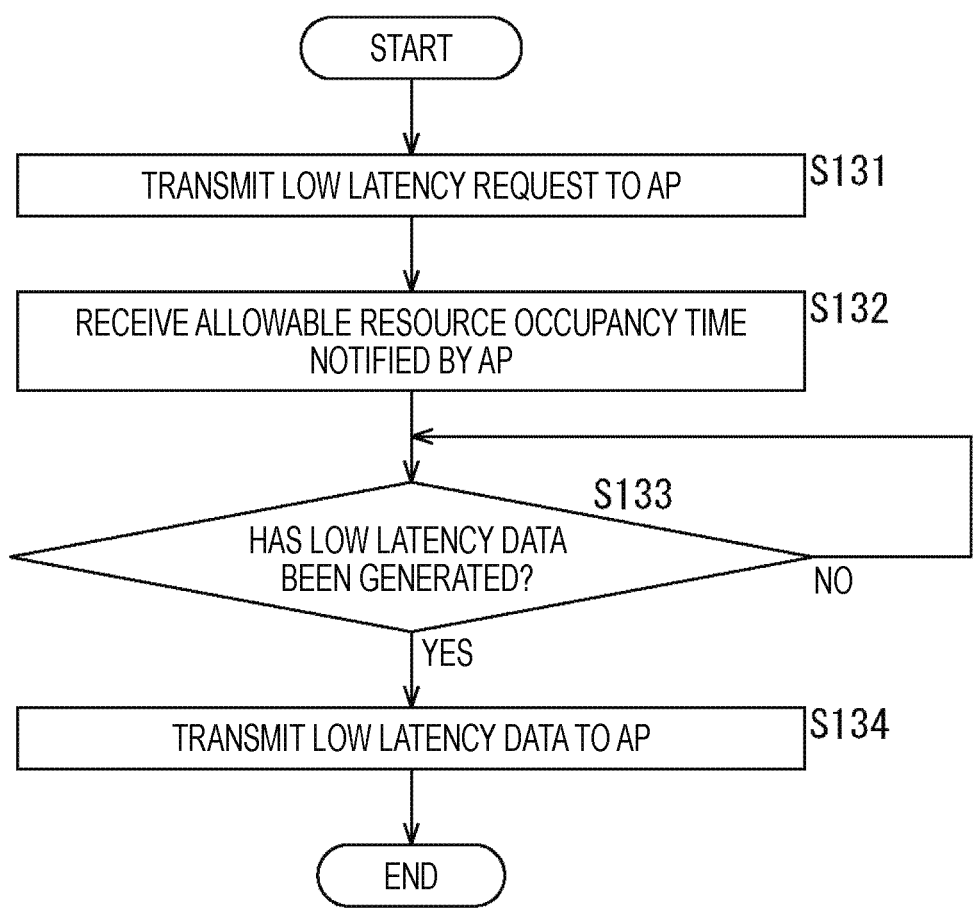
FIG. 8 is a flowchart illustrating an operation of the STA.

Also, an operation of the STA 130 serving as a source of low latency data out of the STAs 130 will be described with reference to the flowchart in FIG. 8.

In step S131, the wireless communication unit 132 transmits a low latency request to the AP 110 via the antenna 133.

In step S132, the wireless communication unit 132 receives the allowable resource occupancy time notified by the AP 110 via the antenna 133.

Thereafter, the STA 130 is in a state of performing communication in accordance with the limitation due to the allowable resource occupancy time. In this state, the data processing unit 111 determines in step S133 whether or not low latency data has been generated. The processing in step S133 is repeated until it is determined that the low latency data has been generated.

In a case where it is determined that the low latency data has been generated, in step S134, the wireless communication unit 132 transmits the generated low latency data to the AP 110 via the antenna 133.

According to the above processing, the resource occupancy time for each STA is limited in accordance with generation of low latency data in the BSS. Consequently, in a case where low latency data to be preferentially transmitted with low latency is generated, low latency wireless communication by the STA serving as a source of the low latency data can be achieved more reliably.

Note that, although the processing in a case where the STA is a source of low latency data has been described above, the AP may be the source of low latency data. For example, the AP becomes a source of low latency data in response to a low latency request from an application, calculates the allowable resource occupancy time in response to the low latency request, and notifies the STAs in the BSS.

<3. Interference by Adjacent Network>

By the way, in a case where one BSS including an AP and an STA is adjacent to another BSS including another AP and another STA, there is a possibility that interference by the other BSS occurs.

Figure 9:
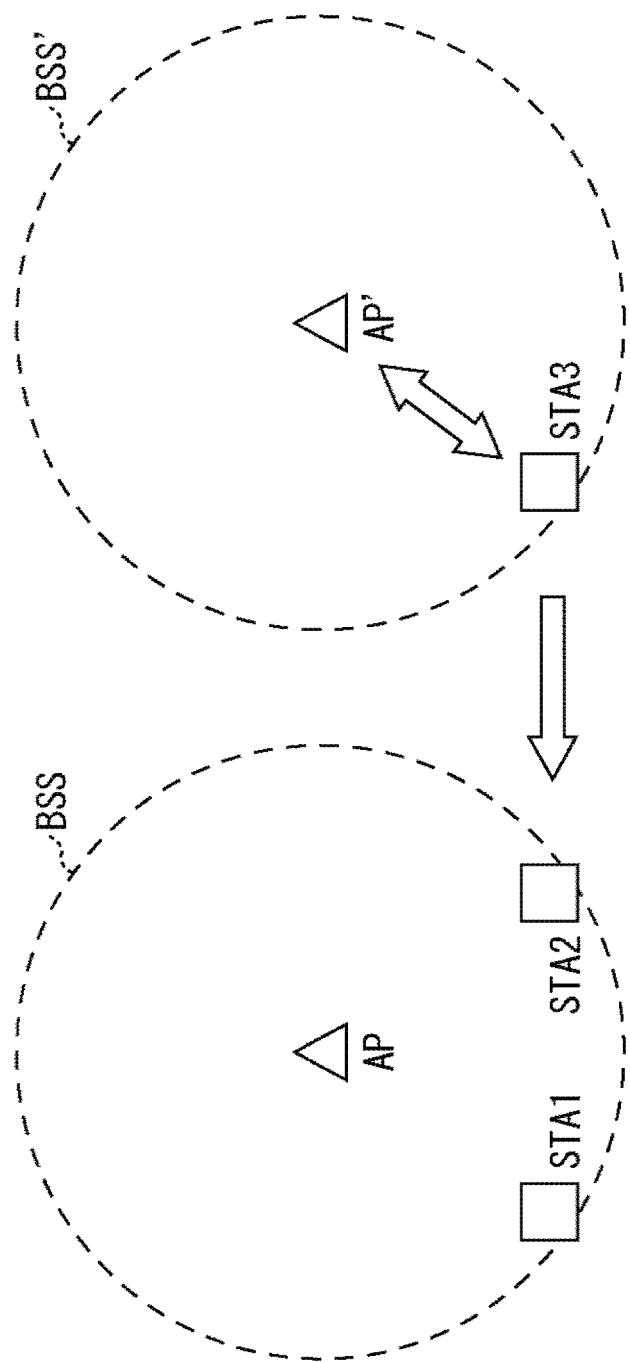
FIG. 9 is a diagram illustrating interference by an adjacent network.

For example, as illustrated in FIG. 9, suppose that a BSS including one AP and two STAs, the STA 1 and the STA 2, is adjacent to a BSS' including one AP' and one STA 3.

In the BSS', communication is performed between the AP' and the STA 3. Here, in a case where the distance between the STA 2 and the STA 3 is short, the STA 2 may refrain from using the wireless resources due to the LBT function while the STA 3 is communicating with the AP'. In a case where the STA 2 is a source of low latency data, the time until the end of transmission of data by the STA 3 has a great influence on data transmission by the STA 2, which hinders low latency wireless communication.

Figure 10:
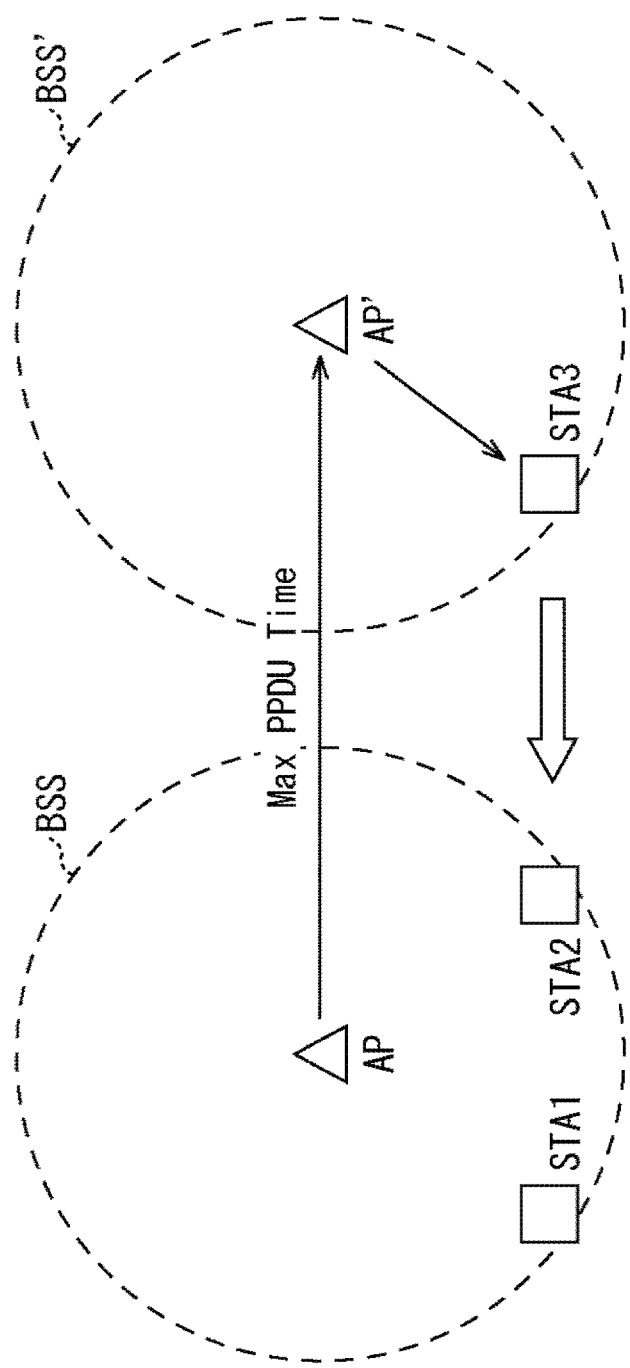
FIG. 10 is a diagram illustrating notification of allowable resource occupancy time to an adjacent AP.

Under such circumstances, as illustrated in FIG. 10, the AP (wireless communication unit 112) included in the BSS notifies not only the STA 1 and the STA 2 in the BSS but also the AP' included in the adjacent BSS' of the allowable resource occupancy time (maximum PPDU time).

In this case, the AP' notifies the STA 3 of the allowable resource occupancy time notified by the AP. As a result, since the resource occupancy time for the STA 3 is limited even in the BSS' adjacent to the BSS, low latency wireless communication by the STA 2 can be achieved more reliably.

<4. Reservation for Wireless Resources>

By the way, in the communication protocol defined in IEEE 802.11, the wireless resources are allocated in an autonomous decentralized manner and at random in order to maintain fairness among terminals. Therefore, only the limitation due to the resource occupancy time described above may not be sufficient to achieve low latency wireless communication.

For example, in the example in FIG. 3, there is a case where, after the end of the data transmission by the STA 1, the STA 1 obtains the right to access the wireless resources again and starts data transmission. In this case, the low latency request of the STA 2 cannot be satisfied.

Accordingly, described below is an example in which a source of low latency data reserves the wireless resources to achieve low latency wireless communication.

FIRST EXAMPLE

Figure 11:
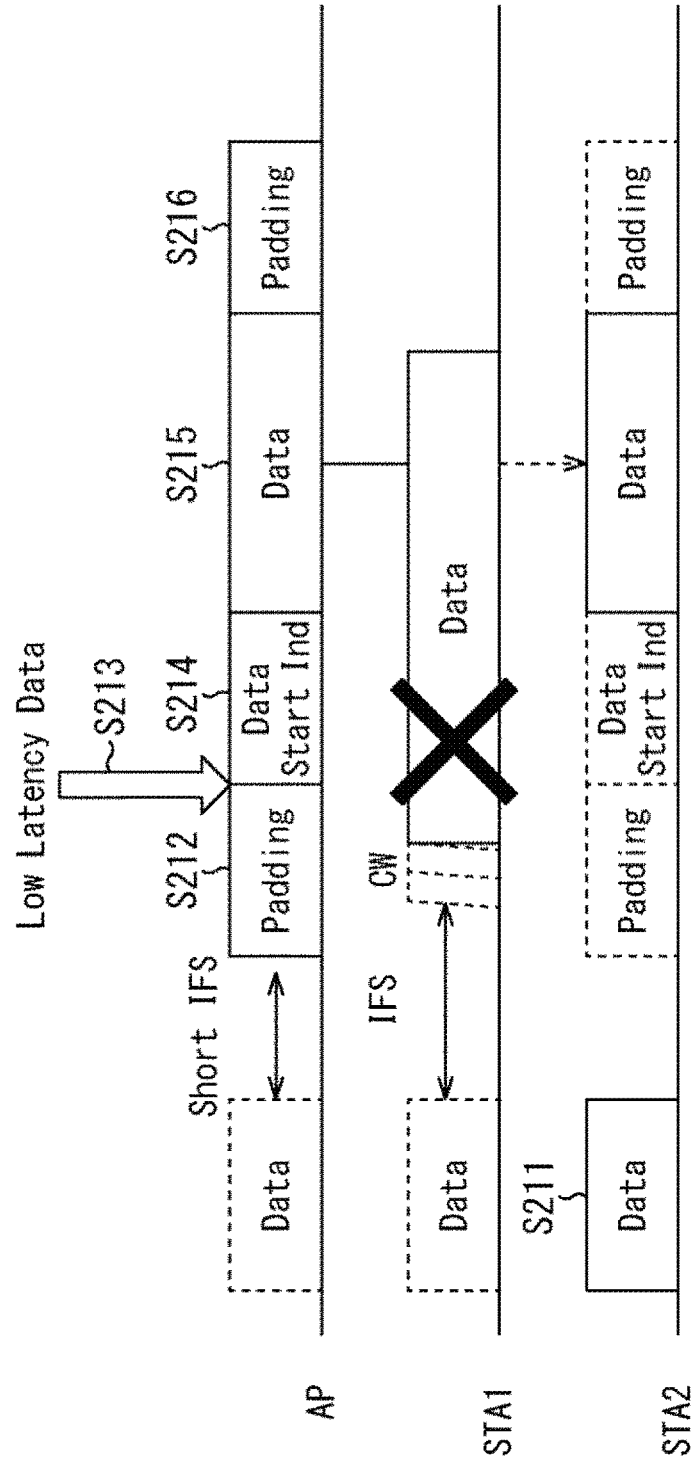
FIG. 11 is a diagram illustrating a reservation of wireless resources.

FIG. 11 is a diagram illustrating a first example of a configuration in which a source of low latency data reserves wireless resources.

In the example in FIG. 11, for example, in response to a low latency request from an application, the AP becomes a source of low latency data and thus transmits the low latency data to the STA 2.

For example, in step S211, the STA 2 transmits data within the BSS.

After the data transmission by the STA 2 ends, and Short IFS, which is shorter than the IFS, elapses, and before another STA occupies the wireless resources, the AP starts transmitting Padding as a reservation signal for preferentially occupying the wireless resources in step S212.

The transmission of the Padding is started at a time corresponding to the allowable latency time for the low latency data included in the low latency request by the application, regardless of presence or absence of data to be transmitted to the STA 2. For example, the transmission of the Padding is started at a time based on the relationship with the allowable resource occupancy time (maximum PPDU time) so that the low latency data can be transmitted (completed) to the STA 2 within the allowable latency time. Also, the transmission of the Padding is repeated during the period in which the AP occupies the wireless resources.

As a result, it is possible to prevent the STA 1 from starting the data transmission even after the data transmission by the STA 2 ends, and the IFS and the CW elapse.

Note that information to STAs other than the STA 2 and other useful information may be inserted into the reservation signal.

When the low latency data is generated inside the AP in step S213 in the state where the wireless resources are reserved in this manner, the AP transmits Data Start Indication in step S214. The Data Start Indication is a signal for notifying the transmission destination of generation of the low latency data.

After transmitting the Data Start Indication, the AP transmits the low latency data in step S215. Thereafter, in step S216, the AP repeatedly transmits the Padding until the period to occupy the wireless resources ends. That is, the AP inserts the Data Start Indication and the low latency data into the reservation signal and transmits the Data Start Indication and the low latency data to the STA 2.

As described above, the AP reserves the wireless resources to enable low latency wireless communication with the STA 2 to be achieved even more reliably.

SECOND EXAMPLE

Figure 12:
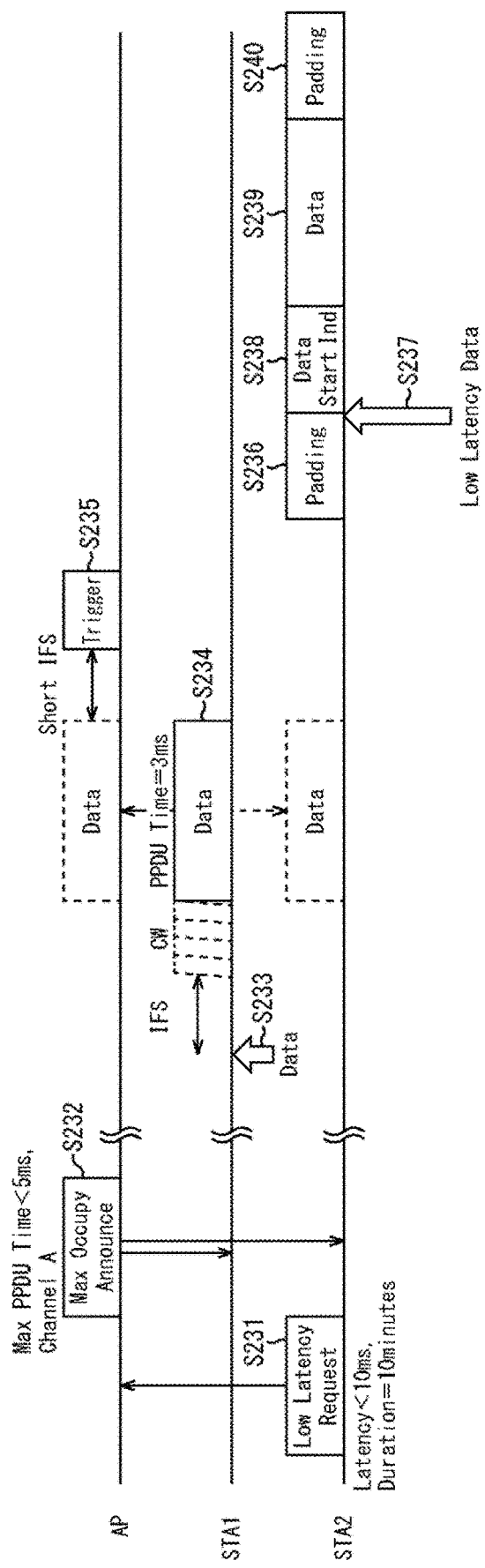
FIG. 12 is a diagram illustrating a reservation of wireless resources.

FIG. 12 is a diagram illustrating a second example of a configuration in which a source of low latency data reserves wireless resources.

In the example in FIG. 12, the STA 2, which has transmitted a low latency request, becomes a source of low latency data and thus transmits the low latency data to the AP.

Note that, since the data flow in steps S231 to S234 in FIG. 12 is the same as the data flow in steps S31 to S34 in FIG. 3, the description thereof will be omitted.

After the data transmission by the STA 1 ends in step S234, and Short IFS, which is shorter than the IFS, elapses, the AP transmits a trigger frame to each STA in step S235.

The trigger frame is a frame defined in IEEE 802.11AX for the AP to control uplink communication from each STA. In the embodiment of the present disclosure, the trigger frame including information indicating that uplink communication from the STA 2 is to be preferentially performed is transmitted to each STA.

In a case where the right to access the wireless resources is given to the STA 2 by such a trigger frame, the STA 2 starts transmitting a reservation signal (Padding) for preferentially occupying the wireless resources in step S236.

The transmission of the Padding is started at a time corresponding to the allowable latency time for the low latency data included in the low latency request and is repeated during the period in which the STA 2 occupies the wireless resources.

This can prevent the STA 1 from starting data transmission.

When the low latency data is generated inside the STA 2 in step S237 in the state where the wireless resources are reserved in this manner, the STA 2 transmits Data Start Indication in step S238.

After transmitting the Data Start Indication, the STA 2 transmits the low latency data in step S239. Thereafter, in step S240, the STA 2 repeatedly transmits the Padding until the period to occupy the wireless resources ends. That is, the STA 2 inserts the Data Start Indication and the low latency data into the reservation signal and transmits the Data Start Indication and the low latency data to the AP.

As described above, the STA 2 reserves the wireless resources to enable low latency wireless communication with the AP to be achieved even more reliably.

<5. Application Examples>

Application examples according to the present disclosure will be described below.

The technology according to the present disclosure can be applied to various products. For example, the STA 130 may be achieved as a mobile terminal such as a smartphone, a tablet personal computer (PC), a notebook PC, a portable video game terminal, and a digital camera. The STA 130 may also be achieved as a fixed terminal such as a television receiver, a printer, a digital scanner, and a network storage, or an in-vehicle terminal such as a car navigation device.

The STA 130 can further be achieved as a terminal that performs machine to machine (M2M) communication (also referred to as a machine type communication (MTC) terminal) such as a smart meter, a vending machine, a remote monitoring device, and a point of sale (POS) terminal. Also, the STA 130 may be a wireless communication module (for example, an integrated circuit module including one die) mounted on these terminals.

On the other hand, for example, the AP 110 may be achieved as a wireless LAN access point (also referred to as a wireless base station) having a router function or not having a router function. The AP 110 may also be achieved as a mobile wireless LAN router. Also, the AP 110 may be a wireless communication module (for example, an integrated circuit module including one die) mounted on these devices.

FIRST APPLICATION EXAMPLE

Figure 13:
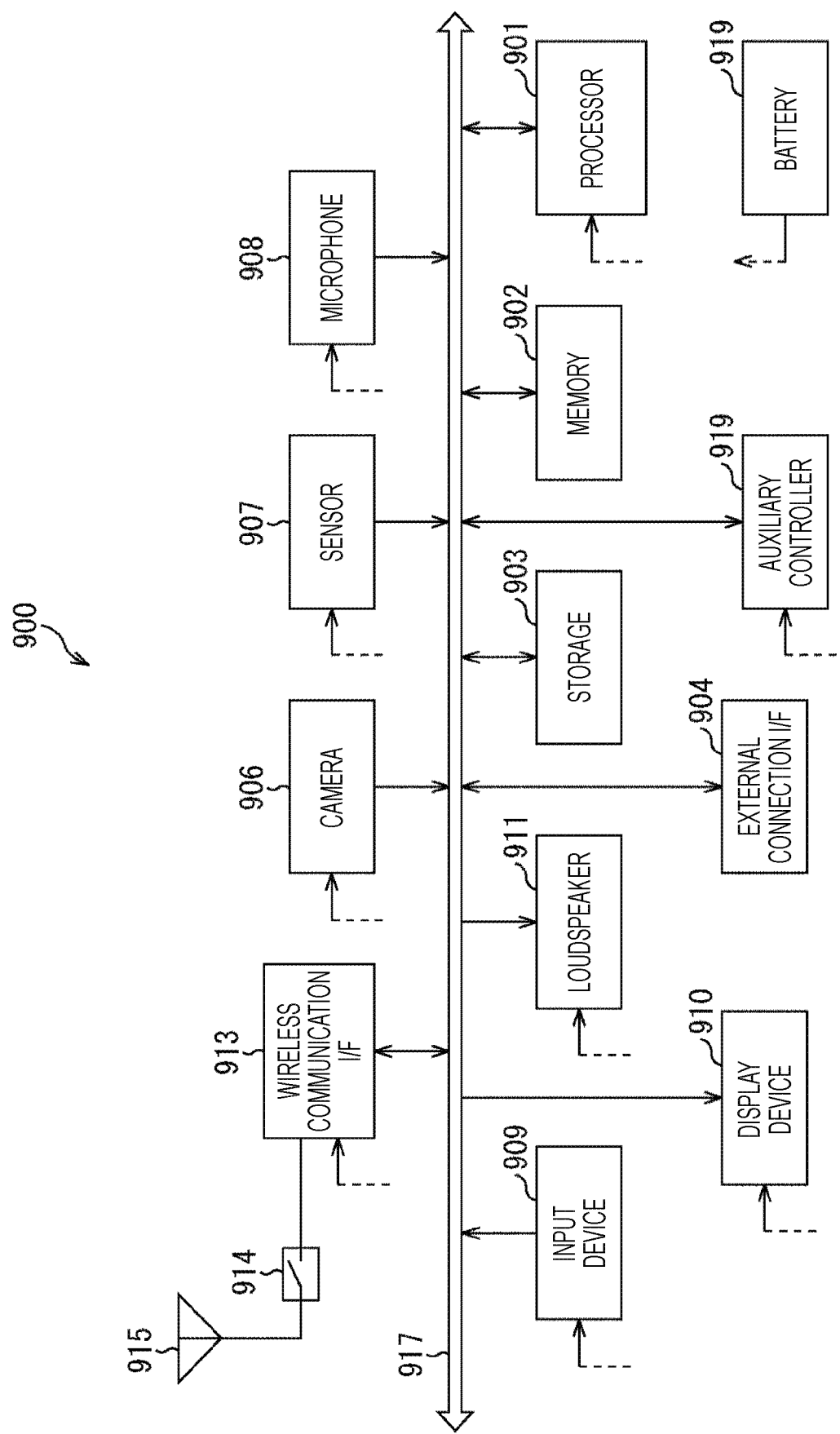
FIG. 13 is a block diagram illustrating a configuration example of a smartphone.

FIG. 13 is a block diagram illustrating an example of a schematic configuration of a smartphone 900 to which the technology according to the present disclosure is applied. The smartphone 900 includes a processor 901, a memory 902, a storage 903, an external connection interface 904, a camera 906, a sensor 907, a microphone 908, an input device 909, a display device 910, a loudspeaker 911, a wireless communication interface 913, an antenna switch 914, an antenna 915, a bus 917, a battery 918, and an auxiliary controller 919.

The processor 901 may be a central processing unit (CPU) or a system on chip (SOC), for example, and controls the functions of the application layer and other layers of the smartphone 900. The memory 902 includes a random access memory (RAM) and a read only memory (ROM) and stores a program and data executed by the processor 901. The storage 903 includes a storage medium such as a semiconductor memory and a hard disk. The external connection interface 904 is an interface for connecting an external device such as a memory card and a universal serial bus (USB) device to the smartphone 900.

The camera 906 includes an image sensing device such as a charge coupled device (CCD) and a complementary metal oxide semiconductor (CMOS), for example, and generates a captured image. The sensor 907 includes a group of sensors such as a positioning sensor, a gyro sensor, a geomagnetic sensor, and an acceleration sensor, for example. The microphone 908 converts a sound input into the smartphone 900 into an audio signal. The input device 909 includes a touch sensor that detects touch on the screen of the display device 910, a keypad, a keyboard, a button, or a switch, for example, and receives an operation or information input from a user. The display device 910 includes a screen such as a liquid crystal display (LCD) and an organic light emitting diode (OLED) display and displays an output image of the smartphone 900. The loudspeaker 911 converts an audio signal output from the smartphone 900 into a sound.

The wireless communication interface 913 supports one or more of the wireless LAN standards such as IEEE802.11A, 11B, 11G, 11N, 11AC, and 11AD to execute wireless communication. The wireless communication interface 913 communicates with another device via a wireless LAN access point in an infrastructure mode. Also, the wireless communication interface 913 directly communicates with another device in a direct communication mode such as an ad hoc mode and Wi-Fi Direct (registered trademark). Note that, in Wi-Fi Direct, unlike in the ad hoc mode, one of the two terminals operates as an access point, and communication is performed directly between these terminals. The wireless communication interface 913 typically includes a baseband processor, a radio frequency (RF) circuit, a power amplifier, and the like. The wireless communication interface 913 may be a one-chip module in which a memory that stores a communication control program, a processor that executes the program, and related circuits are integrated. The wireless communication interface 913 may support other types of wireless communication system such as a near field wireless communication system, a close proximity wireless communication system, and a cellular communication system in addition to the wireless LAN system. The antenna switch 914 switches a connection destination of the antenna 915 among a plurality of circuits (for example, circuits for different wireless communication systems) included in the wireless communication interface 913. The antenna 915 includes a single antenna element or a plurality of antenna elements (for example, a plurality of antenna elements included in a MIMO antenna) and is used for transmission and reception of a wireless signal by the wireless communication interface 913.

Note that the smartphone 900 is not limited to one in the example in FIG. 13 and may include a plurality of antennae (for example, an antenna for a wireless LAN and an antenna for a close proximity wireless communication system). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the loudspeaker 911, the wireless communication interface 913, and the auxiliary controller 919 to each other. The battery 918 supplies power to the respective blocks of the smartphone 900 via the power supply lines partially illustrated by the dashed lines in the figure. The auxiliary controller 919 operates the minimum necessary functions of the smartphone 900 in a sleep mode, for example.

In the smartphone 900 illustrated in FIG. 13, the data processing unit 131, the wireless communication unit 132, and the control unit 134 described with reference to FIG. 5 may be implemented in the wireless communication interface 913. Also, at least some of these functions may be implemented in the processor 901 or the auxiliary controller 919.

Note that the processor 901 may execute an access point function at an application level to cause the smartphone 900 to operate as a wireless access point (software AP). Also, the wireless communication interface 913 may have a wireless access point function.

SECOND APPLICATION EXAMPLE

Figure 14:
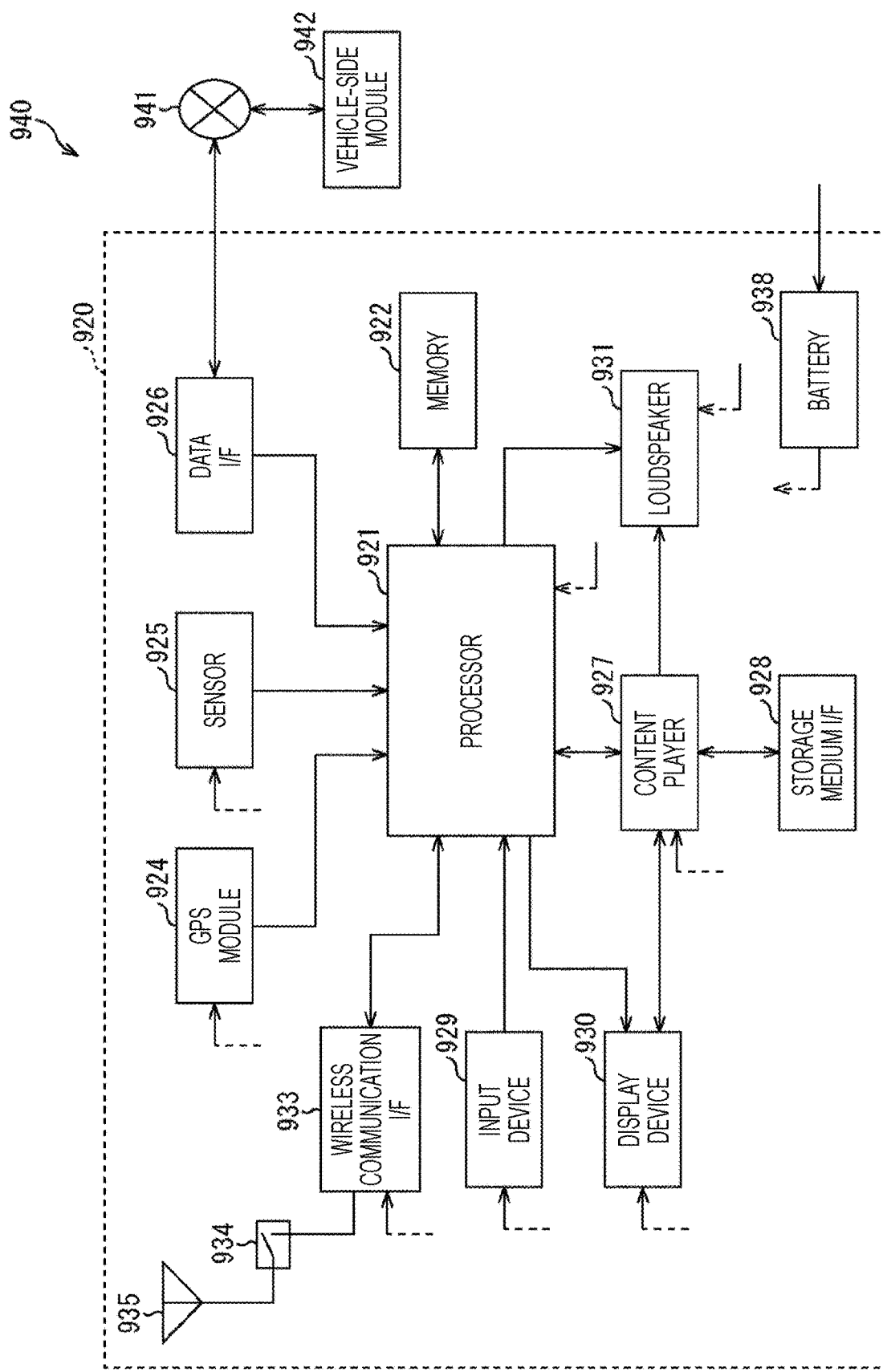
FIG. 14 is a block diagram illustrating a configuration example of a car navigation device.

FIG. 14 is a block diagram illustrating an example of a schematic configuration of a car navigation device 920 to which the technology according to the present disclosure is applied. The car navigation device 920 includes a processor 921, a memory 922, a global positioning system (GPS) module 924, a sensor 925, a data interface 926, a content player 927, a storage medium interface 928, an input device 929, a display device 930, a loudspeaker 931, a wireless communication interface 933, an antenna switch 934, an antenna 935, and a battery 938.

The processor 921 may be a CPU or an SOC, for example, and controls a navigation function and other functions of the car navigation device 920. The memory 922 includes a RAM and a ROM and stores a program and data executed by the processor 921.

The GPS module 924 uses a GPS signal received from a GPS satellite to measure a position (for example, latitude, longitude and altitude) of the car navigation device 920. The sensor 925 includes a group of sensors such as a gyro sensor, a geomagnetic sensor, and a barometric sensor, for example. The data interface 926 is connected to an in-vehicle network 941 via a not-illustrated terminal, for example, and acquires data generated on the vehicle side such as vehicle speed data.

The content player 927 plays a content stored in a storage medium (for example, a CD or a DVD) inserted in the storage medium interface 928. The input device 929 includes a touch sensor that detects touch on the screen of the display device 930, a button, or a switch, for example, and receives an operation or information input from a user. The display device 930 includes a screen such as an LCD and an OLED display and displays an image of the navigation function or the content to be played. The loudspeaker 931 outputs a sound of the navigation function or the content to be played.

The wireless communication interface 933 supports one or more of the wireless LAN standards such as IEEE802.11A, 11B, 11G, 11N, 11AC, and 11AD to execute wireless communication. The wireless communication interface 933 communicates with another device via a wireless LAN access point in an infrastructure mode. Also, the wireless communication interface 933 directly communicates with another device in a direct communication mode such as an ad hoc mode and Wi-Fi Direct. The wireless communication interface 933 typically includes a baseband processor, an RF circuit, a power amplifier, and the like. The wireless communication interface 933 may be a one-chip module in which a memory that stores a communication control program, a processor that executes the program, and related circuits are integrated. The wireless communication interface 933 may support other types of wireless communication system such as a near field wireless communication system, a close proximity wireless communication system, and a cellular communication system in addition to the wireless LAN system. The antenna switch 934 switches a connection destination of the antenna 935 among a plurality of circuits included in the wireless communication interface 933. The antenna 935 includes a single antenna element or a plurality of antenna elements and is used for transmission and reception of a wireless signal by the wireless communication interface 933.

Note that the car navigation device 920 is not limited to one in the example in FIG. 14 and may include a plurality of antennae. In this case, the antenna switch 934 may be omitted from the configuration of the car navigation device 920.

The battery 938 supplies power to the respective blocks of the car navigation device 920 via the power supply lines partially illustrated by the dashed lines in the figure. The battery 938 also charges power supplied from the vehicle side.

In the car navigation device 920 illustrated in FIG. 14, the data processing unit 131, the wireless communication unit 132, and the control unit 134 described with reference to FIG. 5 may be implemented in the wireless communication interface 933. Also, at least some of these functions may be implemented in the processor 921.

Also, the wireless communication interface 933 may operate as the AP 110 described above and provide wireless connection to a terminal owned by a user in the vehicle.

Also, the technology according to the present disclosure may be achieved as an in-vehicle system (or a vehicle) 940 including one or more blocks of the car navigation device 920 described above, the in-vehicle network 941, and a vehicle-side module 942. The vehicle-side module 942 generates vehicle-side data such as vehicle speed, engine speed, and failure information and outputs the generated data to the in-vehicle network 941.

THIRD APPLICATION EXAMPLE

FIG. 15 is a block diagram illustrating an example of a schematic configuration of a wireless access point 950 to which the technology according to the present disclosure is applied. The wireless access point 950 includes a controller 951, a memory 952, an input device 954, a display device 955, a network interface 957, a wireless communication interface 963, an antenna switch 964, and an antenna 965.

The controller 951 may be a CPU or a digital signal processor (DSP), for example, and controls various functions (for example, access limitation, routing, encryption, firewall, and log management) on the internet protocol (IP) layer and higher layers of the wireless access point 950. The memory 952 includes a RAM and a ROM and stores a program executed by the controller 951 and various control data (for example, a terminal list, a routing table, an encryption key, security setting, and a log).

The input device 954 includes a button or a switch, for example, and receives an operation from a user. The display device 955 includes an LED lamp and the like and displays an operation status of the wireless access point 950.

The network interface 957 is a wired communication interface for the wireless access point 950 to connect to a wired communication network 958. The network interface 957 may have a plurality of connection terminals. The wired communication network 958 may be a LAN such as Ethernet (registered trademark) or a wide area network (WAN).

The wireless communication interface 963 supports one or more of the wireless LAN standards such as IEEE802.11A, 11B, 11G, 11N, 11AC, and 11AD and provides as an access point wireless connection to nearby terminals. The wireless communication interface 963 typically includes a baseband processor, an RF circuit, a power amplifier, and the like. The wireless communication interface 963 may be a one-chip module in which a memory that stores a communication control program, a processor that executes the program, and related circuits are integrated. The antenna switch 964 switches a connection destination of the antenna 965 among a plurality of circuits included in the wireless communication interface 963. The antenna 965 includes a single antenna element or a plurality of antenna elements and is used for transmission and reception of a wireless signal by the wireless communication interface 963.

In the wireless access point 950 illustrated in FIG. 15, the data processing unit 111, the wireless communication unit 112, and the control unit 114 described with reference to FIG. 4 may be implemented in the wireless communication interface 963. Also, at least some of these functions may be implemented in the controller 951.

Note that the embodiment of the technology according to the present disclosure is not limited to the aforementioned embodiment, and that various changes can be made without departing from the scope of the technology according to the present disclosure.

Also, effects described in the present description are illustrative only and shall not be limited, and other effects may exist.

Further, the technology according to the present disclosure can also employ the following configuration.

(1)

A wireless communication control device including:

a calculation unit that calculates allowable resource occupancy time in a wireless communication network to which an own device belongs in response to a low latency request for data generated in the wireless communication network; and a wireless communication unit that notifies a wireless communication device in the wireless communication network of the allowable resource occupancy time calculated.

(2)

The wireless communication control device according to (1), in which the low latency request includes allowable latency time for the data, and the calculation unit calculates the allowable resource occupancy time on the basis of the allowable latency time.

(3)

The wireless communication control device according to (2), in which the low latency request further includes duration of the low latency request.

(4)

The wireless communication control device according to any one of (1) to (3), in which the wireless communication unit further notifies the wireless communication device in the wireless communication network of duration of limitation due to the allowable resource occupancy time.

(5)

The wireless communication control device according to any one of (1) to (4), in which the wireless communication unit further notifies the wireless communication device in the wireless communication network of band subject to the limitation due to the allowable resource occupancy time.

(6)

The wireless communication control device according to any one of (1) to (5), in which the wireless communication unit also notifies another wireless communication control device that forms another wireless communication network of the allowable resource occupancy time.

(7)

The wireless communication control device according to any one of (1) to (6), in which, in a case where the own device is a source of the data, the wireless communication unit transmits a reservation signal for the own device to preferentially occupy a wireless resource to a transmission destination device to which the data is to be transmitted.

(8)

The wireless communication control device according to (7), in which the wireless communication unit transmits the reservation signal to the transmission destination device at a time corresponding to the allowable latency time for the data included in the low latency request.

(9)

The wireless communication control device according to (7) or (8), in which, when the data is generated in the own device, the wireless communication unit inserts the data into the reservation signal and transmits the data to the transmission destination device.

(10)

The wireless communication control device according to any one of (1) to (6), in which the wireless communication unit receives the low latency request from a requesting device out of the wireless communication device in the wireless communication network.

(11)

The wireless communication control device according to (10), in which the wireless communication unit receives from the requesting device a reservation signal for the requesting device to preferentially occupy the wireless resource.

(12)

The wireless communication control device according to (11), in which, when the data is generated in the requesting device, the wireless communication unit receives the data inserted in the reservation signal from the requesting device.

(13)

A wireless communication control method including:

calculating, by a wireless communication control device, allowable resource occupancy time in a wireless communication network to which an own device belongs in response to a low latency request for data generated in the wireless communication network; and notifying, by the wireless communication control device, a wireless communication device in the wireless communication network of the allowable resource occupancy time calculated.

(14)

A wireless communication device including:

a wireless communication unit that receives allowable resource occupancy time notified by a wireless communication control device in response to a low latency request for data generated in a wireless communication network to which an own device belongs, in which the wireless communication unit performs wireless communication in accordance with limitation due to the allowable resource occupancy time.

(15)

The wireless communication device according to (14), in which, in a case where the own device is a source of the data, the wireless communication unit transmits the low latency request to the wireless communication control device.

(16)

The wireless communication device according to (15), in which the wireless communication unit further transmits a reservation signal for the own device to preferentially occupy a wireless resource to the wireless communication control device.

(17)

The wireless communication device according to (16), in which the wireless communication unit transmits the reservation signal to the wireless communication control device at a time corresponding to allowable latency time for the data included in the low latency request.

(18)

The wireless communication device according to (16) or (17), in which, when the data is generated in the own device, the wireless communication unit inserts the data into the reservation signal and transmits the data to the wireless communication control device.

(19)

A wireless communication method including:

receiving, by a wireless communication device, allowable resource occupancy time notified by a wireless communication control device in response to a low latency request for data generated in a wireless communication network to which an own device belongs; and performing, by the wireless communication device, wireless communication in accordance with limitation due to the allowable resource occupancy time.

REFERENCE SIGNS LIST

110 AP
111 Data processing unit
112 Wireless communication unit
114 Control unit
121 Calculation unit
130 STA
131 Data processing unit
132 Wireless communication unit
134 Control unit

The invention claimed is:

1. A wireless communication control device comprising:
a processor that calculates allowable resource occupancy time in a wireless communication network to which an own device belongs in response to a low latency request for data generated in the wireless communication network; and
a wireless transceiver that notifies a wireless communication device in the wireless communication network of the allowable resource occupancy time calculated,
wherein, in a case where the own device is a source of the data, the wireless transceiver transmits a reservation signal for the own device to preferentially occupy a wireless resource to a transmission destination device to which the data is to be transmitted, and wherein the reservation signal is transmitted to the transmission destination device at a time corresponding to the allowable latency time for the data included in the low latency request.

2. The wireless communication control device according to claim 1,
wherein the low latency request includes allowable latency time for the data, and
the processor calculates the allowable resource occupancy time on a basis of the allowable latency time.

3. The wireless communication control device according to claim 2,
wherein the low latency request further includes duration of the low latency request.

4. The wireless communication control device according to claim 1,
wherein the wireless transceiver further notifies the wireless communication device in the wireless communication network of duration of limitation due to the allowable resource occupancy time.

5. The wireless communication control device according to claim 1,
wherein the wireless transceiver further notifies the wireless communication device in the wireless communication network of band subject to the limitation due to the allowable resource occupancy time.

6. The wireless communication control device according to claim 1,
wherein the wireless transceiver also notifies another wireless communication control device that forms another wireless communication network of the allowable resource occupancy time.

7. The wireless communication control device according to claim 1,
wherein, when the data is generated in the own device, the wireless transceiver inserts the data into the reservation signal and transmits the data to the transmission destination device.

8. The wireless communication control device according to claim 1,
wherein the wireless transceiver receives the low latency request from a requesting device out of the wireless communication device in the wireless communication network.

9. The wireless communication control device according to claim 8,
wherein the wireless transceiver receives from the requesting device a reservation signal for the requesting device to preferentially occupy the wireless resource.

10. The wireless communication control device according to claim 9,
wherein, when the data is generated in the requesting device, the wireless transceiver receives the data inserted in the reservation signal from the requesting device.

11. A wireless communication control method performed by a wireless communication control device, the method comprising:
calculating allowable resource occupancy time in a wireless communication network to which an own device belongs in response to a low latency request for data generated in the wireless communication network; and
notifying a wireless communication device in the wireless communication network of the allowable resource occupancy time calculated,
wherein, in a case where the own device is a source of the data, the method further includes transmitting a reservation signal for the own device to preferentially occupy a wireless resource to a transmission destination device to which the data is to be transmitted, and
wherein the reservation signal is transmitted to the transmission destination device at a time corresponding to the allowable latency time for the data included in the low latency request.

12. A wireless communication device comprising:
a wireless transceiver that receives allowable resource occupancy time notified by a wireless communication control device in response to a low latency request for data generated in a wireless communication network to which an own device belongs,
wherein the wireless transceiver performs wireless communication in accordance with limitation due to the allowable resource occupancy time,
wherein, in a case where the own device is a source of the data, the wireless transceiver transmits the low latency request to the wireless communication control device,
wherein the wireless transceiver further transmits a reservation signal for the own device to preferentially occupy a wireless resource to the wireless communication control device, and
wherein the wireless transceiver transmits the reservation signal to the wireless communication control device at a time corresponding to allowable latency time for the data included in the low latency request.

13. The wireless communication device according to claim 12,
wherein, when the data is generated in the own device, the wireless transceiver inserts the data into the reservation signal and transmits the data to the wireless communication control device.

14. A wireless communication method comprising:
receiving, by a wireless communication device, allowable resource occupancy time notified by a wireless communication control device in response to a low latency request for data generated in a wireless communication network to which an own device belongs; and
performing, by the wireless communication device, wireless communication in accordance with limitation due to the allowable resource occupancy time,
wherein, in a case where the own device is a source of the data, the wireless transceiver transmits the low latency request to the wireless communication control device,
wherein the wireless transceiver further transmits a reservation signal for the own device to preferentially occupy a wireless resource to the wireless communication control device, and
wherein the wireless transceiver transmits the reservation signal to the wireless communication control device at a time corresponding to allowable latency time for the data included in the low latency request.

* * * * *